(12) United States Patent
Kee

(10) Patent No.: US 11,740,137 B2
(45) Date of Patent: Aug. 29, 2023

(54) MULTI-SENSING PTAT FOR MULTIPLE-LOCATION TEMPERATURE SENSING

(71) Applicant: AyDeeKay LLC, Aliso Viejo, CA (US)

(72) Inventor: Scott David Kee, Aliso Viejo, CA (US)

(73) Assignee: AyDeeKay LLC, Aliso Viejo, CA (US)

( * ) Notice: Subject to any disclaimer, the term of this patent is extended or adjusted under 35 U.S.C. 154(b) by 265 days.

(21) Appl. No.: 17/037,311

(22) Filed: Sep. 29, 2020

(65) Prior Publication Data

US 2022/0099501 A1 Mar. 31, 2022

(51) Int. Cl.
| | | |
|---|---|---|
| G01K 7/01 | (2006.01) | |
| G01K 13/00 | (2021.01) | |
| G05D 23/19 | (2006.01) | |
| G05D 23/20 | (2006.01) | |

(52) U.S. Cl.
CPC ............ G01K 7/01 (2013.01); G01K 13/00 (2013.01); *G05D 23/193* (2013.01); *G05D 23/1927* (2013.01); *G05D 23/1932* (2013.01); *G05D 23/2034* (2013.01)

(58) Field of Classification Search
CPC ...... G01K 7/01; G01K 13/00; G05D 23/1927; G05D 23/193; G05D 23/1932; G05D 23/2034
See application file for complete search history.

(56) References Cited

U.S. PATENT DOCUMENTS

| | | |
|---|---|---|
| 5,991,852 A | 11/1999 | Bagley |
| 2006/0221741 A1 | 10/2006 | Jain et al. |
| 2013/0009655 A1* | 1/2013 | Marten ............. G01R 19/0092 324/713 |
| 2015/0283547 A1 | 10/2015 | Hasson et al. |
| 2016/0252409 A1 | 9/2016 | Lu et al. |
| 2017/0234564 A1* | 8/2017 | Goel ..................... F24F 1/0003 62/93 |
| 2017/0254839 A9 | 9/2017 | Draxelmayr et al. |
| 2018/0073933 A1 | 3/2018 | Keskin et al. |
| 2018/0252597 A1* | 9/2018 | Jokinen ................ G01K 15/005 |
| 2019/0101947 A1 | 4/2019 | Mercier et al. |
| 2019/0109038 A1 | 4/2019 | Horng et al. |
| 2020/0041357 A1 | 2/2020 | Lam |

FOREIGN PATENT DOCUMENTS

JP        2014145746 A        8/2014

OTHER PUBLICATIONS

PCT/US21/52073, International Search Report and Written Opinion, dated Dec. 23, 2021.

* cited by examiner

*Primary Examiner* — Marc E Norman
(74) *Attorney, Agent, or Firm* — Steven Stupp

(57) ABSTRACT

An integrated circuit that controls distributed temperature sensors in a semiconductor die is described. This integrated circuit may include: memory; a controller (such as a PTAT controller) coupled to the memory; temperature sensors distributed at measurement locations in the semiconductor die (such as remote locations from the controller), where a given temperature sensor includes building blocks (or components) that are common to the temperature sensors; and routing between the controller and the building blocks over an addressable bus, where signal lines for analog signals in the addressable bus are reused when communicating between the controller and different temperature sensors.

20 Claims, 8 Drawing Sheets

US 11,740,137 B2

MULTI-SENSING PTAT FOR MULTIPLE-LOCATION TEMPERATURE SENSING

BACKGROUND

Field

The present disclosure relates to an integrated circuit that includes semiconductor temperature sensors.

Related Art

Integrated circuits often incorporate temperature sensors. These temperature sensors may be used to measure the temperature at some location on the semiconductor die. Moreover, a temperature sensor may be used to monitor over-temperature for components with high power consumption, which may allow remedial action, such as reducing the power consumption when there is danger of overheating. More generally, when a performance characteristic of a component has a temperature dependence, measuring the temperature of a component may allow corrective action to be taken. However, these management techniques depend on accurate measurements of temperature in a semiconductor die. Furthermore, because the management techniques use the local temperature of the component being monitored, multiple components in a semiconductor die may require individual temperature monitoring when these components can be at different temperatures because of thermal non-uniformities across the semiconductor area. Additionally, it is often beneficial to locate a temperature sense device close to the component being monitored, so that the temperature measurements accurately reflect the actual temperature of the monitored component. Therefore, it is typically useful to have a small and flexible sense device to enable insertion near the location to be measured, and which is ideally inserted into the functional block containing the component to be measured.

Semiconductor temperature sensors are often based on a proportional-to-absolute-temperature (PTAT) technique. The PTAT technique uses the exponential dependence on temperature and voltage of a current-voltage characteristic of a semiconductor junction, such as in a diode or in a similar device, e.g., a bipolar junction transistor or a sub-threshold field effect transistor. By measuring the voltage difference for such a semiconductor junction at two different current densities, the temperature can be determined. Notably, if the two current densities have a ratio of M, then the difference in semiconductor-junction voltage may be $$\frac{\ln(M) \cdot n \cdot k \cdot T}{q},$$

where n is a device-dependent factor, k is Boltzmann's constant, T is the absolute temperature in Kelvin and q is the electron charge. Because all of these parameters except T are constants, this equation is a voltage corresponding to the device temperature multiplied by a fixed coefficient.

FIG. 1 presents a drawing illustrating an existing implementation of a PTAT technique. Notably, two sense devices (SDs) 110-1 and 110-2 (such as temperature sensors) in sensor 118-1 may be placed proximate to a location to be measured. These sense devices often have a scaling factor between them, so that, for any given voltage applied to sense devices 110-1 and 110-2, the current of sense device 110-2 may be a multiple $K_D$ of the current of sense device 110-1. This can be done by implementing sense device 110-2 as $K_D$ parallel-connected instances of sense device 110-1. Alternately, areas of sense device 110-1 and 110-2 may be in a ratio or another technique may be used. It is also possible for sense devices 110-1 and 110-2 to be (at least approximately) identical, so that $K_D$ is nominally equal to one. Moreover, currents 112-1 and 112-2 may be provided to sense devices 110-1 and 110-2 by respective current sources. Note that currents 112-1 and 112-2 may have a controlled ratio, so that current 112-1 is a multiple $K_I$ of current 112-2. The voltage difference between sense devices 110-1 and 110-2 is then measured. For example, terminals for each of sense devices 110-1 and 110-2 may be coupled to a common node (or path) 114, such as ground or another suitable net. In these embodiments, the difference in voltage can be measured as differential voltage 116 between the remaining independent sense-device terminals. Because the current density ratio of sense device 110-1 to sense device 110-2 is $K_D \cdot K_I$, voltage 116 may equal $$\frac{\ln(K_D \cdot K_I) \cdot n \cdot k \cdot T}{q}.$$

Voltage 116 may be used as a temperature indication, such as by digitizing it with an analog-to-digital converter (ADC), providing voltage 116 to a comparator to make a comparison to a particular temperature, or other uses.

One approach that is often used to implement a temperature sensor is a ratioed common-centroid configuration. This is shown in FIG. 2, which presents a drawing of an existing sense device. In FIG. 2, sense device 110-1 and sense devices 110-2 through 110-10 are implemented in a semiconductor die. Notably, sense devices 110-1 and 110-2 through 110-10 may be implemented by tiling nine approximately identical sense devices in a 3-by-3 grid 210-1. The central site in this tiling may be used to implement sense device 110-1, while the remaining eight outer sites are electrically coupled in parallel to implement sense device 110-2 in FIG. 1. Using this spatial configuration, the effect of temperature gradients across the sense area can be reduced, because such a gradient would cause locations of some of sense devices 110-2 through 110-10 to be at higher temperatures than the location of sense device 110-1, while locations of a remainder of sense devices 110-2 through 110-10 to be at lower temperatures than the location of sense device 110-1. Consequently, the increased conductivity of some of sense devices 110-2 through 110-10 at higher-temperature locations may be offset by the decreased conductivity of the remaining instances of sense devices 110-2 through 110-10 at lower-temperature locations, thereby reducing the error. Note that other similar ratioed common-centroid configurations are used in temperature measurements. Moreover, larger tilings or grids of sense devices are sometimes used, so that an outer layer of tile positions can be used as dummy sense devices to improve the electrical matching between sense device 110-1 and sense devices 110-2 through 110-10, thereby excluding the locations of the dummy sense devices along an outer edge of the tiling from temperature measurements.

While the PTAT temperature sense technique can provide accurate temperature measurements, the control circuit(s) used to produce currents 112-1 and 112-2 and to process voltage 116 can have a relatively large area. Notably, these components are typically implemented in the analog domain using matching and/or calibration techniques to produce the accurate current ratios and to accurately process the resulting voltage 116, which can be very small. For example, when $K_I$ and $K_D$ are both 8, the temperature-to-voltage gain may be only 0.36 mV/K. Thus, small inaccuracies in the circuit(s) processing voltage 116 can have a large effect on the temperature measurement. Addressing these issued can result in increased circuit area and complexity, so that the implementation of a temperature sensor may be dominated by the control circuit(s) and processing circuit(s) and not the temperature sensor devices.

Often, the control circuit(s) and the processing circuit(s) are implemented together with the sense devices. However, it can be difficult to locate the sense devices close to the desired location of the semiconductor surface to be measured because of constraint of having to also locate the control circuit(s) and the processing circuit(s) at that location. Moreover, when multiple sensor devices are used, this approach unnecessarily duplicates the control circuit(s) and the processing circuit(s).

Some solutions use a single measurement controller with a built-in multiplexer to allow only the sense devices (such as semiconductor diodes) to be at the location or point of measurement. This is shown in FIG. 3, which presents a drawing illustrating an existing system. In this system, a controller 318 implements the control circuit and the processing circuit, which can be used with multiple sensors 118 located at various remote locations. Each of sensors 118 may include two instances of sense devices 110-1 and 110-2 in order to allow measurement of the temperature at a given location. Moreover, the instances of sense devices 110-1 and 110-2 are electrically coupled to the common controller 318 with independent on-die interconnections 312. Controller 318 may use internal multiplexing (via addressing provided by control logic 314 and switches 316) to allow voltage 310 for each of sensors 118 to be measured one at a time, such as in response to a software query or in some periodic pattern. This can allow a single controller 318 to be used with multiple sensors 118, thereby avoiding the duplication of this component, at the cost of adding additional analog multiplexing functionality in controller 318 and additional analog interconnect routing between controller 318 and the various sensors 118.

FIG. 4 presents an existing chip floorplan associated with controller 318 (FIG. 3). Notably, controller 318 may be placed on the semiconductor chip along with various other blocks (such as functional blocks or FBs 410, logical block or LB 412, input/output or I/O blocks 414, and power converter or PC block 416) that implement the intended functionality of the semiconductor chip. Some of these blocks, such as functional block 410-2, logical block 412, input/output block 414-1 and power converter block 416 may include instances of a temperature sensor, such as grids 210 of sensor devices, e.g., a ratioed common-centroid configuration of sense devices 110-1 and 110-2. The various blocks of the semiconductor chip are electrically interconnected in order to implement the semiconductor-chip functionality, such as by using metalized interconnections 418 in routing channel 420. These interconnections may be used to convey logic signals, power signals, for analog signals or for other purposes. However, because sensitive analog signals can be disturbed by interference from other signals, these interconnects are often routed with shielding by using additional metals around the sensitive analog signals with a low noise signal (such as a ground) to reduce the coupling to other signals. Furthermore, signals that have larger currents or that require lower resistance (such as the signals that carry current through sensors 118) may require a wider width of metal for routes or traces than other signals. These requirements may necessitate that these interconnections are routed by a designer (as opposed to using automated design tools), which may make these interconnections more complicated and more expensive. Additionally, the shielding requirement may use significant metallization resources, particularly in cases where one shielded interconnection must cross another one. This can cause routing congestion and manual rework further increasing design time and expense. Alternatively, it may increase the manufacturing cost if additional metal layers are added to the manufacturing process in order to provide an additional metallization resource. This congestion may particularly problematic in the area near controller 318, because the various shielded analog signal bundles are all routed to this location. Note that, other routing formats, such as over the cell routing, may have similar constraints and concerns.

Existing designs also typically lack flexibility, such as the ability to change the number of sensors 118. Controller 318 and the associated multiplexer usually are implemented with a maximum number of channels. If the number of channels is too few, then unless a second controller is implemented, the number of sensors 118 is constrained. Alternatively, if the number of channels is made large enough so that it unlikely that a semiconductor chip will need more sensors 118 than controller 318 can accommodate, then controller 318 may become excessively large, and may include numerous unused analog multiplexer channels.

SUMMARY

An integrated circuit that controls distributed temperature sensors in a semiconductor die is described. This integrated circuit may include: memory; a controller (such as a PTAT controller) coupled to the memory; the temperature sensors distributed at measurement locations in the semiconductor die (such as remote locations from the controller), where a given temperature sensor includes building blocks (or components) that are common to the temperature sensors; and routing between the controller and the building blocks over an addressable bus, where signal lines (or routes) for analog signals in the addressable bus are reused when communicating between the controller and different temperature sensors.

Moreover, the building blocks in the given temperature sensor may include a common-centroid array of sensor devices and another building block that includes switches and control logic for the switches (such as decode logic). The switches may be controlled by the control logic based at least in part on addressing signals and a given address of the given temperature sensor. In some embodiments, when inactive or unused, the given temperature sensor may include another switch to provide a replica voltage to a terminal of one of the switches in order to maintain approximately zero volts across the one of the switches.

Furthermore, the switches and addressing control logic associated with the controller may be located at different physical locations on the semiconductor die. Note that the addressing control logic may control changes to the number of temperature sensors in the integrated circuit. In some embodiments, the controller may use the memory and the addressing control logic to calibrate the temperature sensors.

Additionally, the signal lines for the analog signals in the addressable bus may use Kelvin sensing. The signal lines for the analog signals to the given temperature sensor may convey: a current to at least a sense device in the given temperature sensor; and a voltage from at least the sense device to the controller.

Note that the addressable bus may include bus routes (such as global bus routes).

In some embodiments, the signal lines for the analog signals in the bus routes are routed together in one or more common shielded groups (or one or more analog bus groups). Note that congestion associated with the bus routes may be eliminated using a single common shielded group.

Moreover, signal lines for logical address signals may be routed with the signal lines for the analog signals, but may not be included in the one or more common shielded groups. Alternatively, the signal lines for the logical address signals may be routed independently of the signal lines for the analog signals.

Furthermore, the number of temperature sensors in the integrated circuit may be limited by a number of bits used for addressing the temperature sensors.

Additionally, when there are N temperature sensors, the addressable bus may include a number of logic routes equal to log 2(N) rounded to the nearest integer.

In some embodiments, the addressable bus includes another signal line from the temperature sensors to the controller, where the controller uses a signal received on the other signal line to generate feedback to the routing to reduce a leakage current.

Note that the integrated circuit may perform sensor calibration. The sensor calibration may include: a calibration mode in which a first sense device in the given temperature sensor is provided a first fixed current and a first controlled (or adjusted) current, and a second sense device in the given temperature sensor is provided a second fixed current; and a measurement mode in which the first sense device is provided a third fixed current and the second sense device is provided a fourth fixed current and a second controlled current. Moreover, the integrated circuit may include a calibration controller that adjusts the first controlled current based at least in part on a voltage observed between the first sense device and the second sense device. This calibration controller may calculate a value of the second controlled current based at least in part on a value of the first controlled current.

In some embodiments, the first fixed current and the fourth fixed current may be the same, and the second fixed current and the third fixed current may be the same. Moreover, the calculation of the second controlled current may include reversing the sign of the first controlled current. Furthermore, second switches may be used to generate the first fixed current and the fourth fixed currents from a (shared) circuit component. Additionally, third switches may be used to generate the first controlled current and the second controlled current from a (shared) current digital-to-analog converter (DAC).

Another embodiment provides an electronic device that includes the integrated circuit.

Another embodiment provides a system that includes the integrated circuit.

Another embodiment provides a method for controlling temperature sensors. This method includes at least some of the operations performed by the integrated circuit.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

Note that like reference numerals refer to corresponding parts throughout the drawings. Moreover, multiple instances of the same part are designated by a common prefix separated from an instance number by a dash.

DETAILED DESCRIPTION

An integrated circuit that controls distributed temperature sensors in a semiconductor die is described. This integrated circuit may include: memory; a controller (such as a PTAT controller) coupled to the memory; temperature sensors distributed at measurement locations in the semiconductor die (such as remote locations from the controller), where a given temperature sensor includes building blocks (or components) that are common to the temperature sensors; and routing between the controller and the building blocks over an addressable bus, where signal lines for analog signals in the addressable bus are reused when communicating between the controller and different temperature sensors.

By communicating with the temperature sensors over an addressable bus, these measurement techniques may reduce the complexity of designing and fabricating the integrated circuit. For example, the routing in the integrated circuit may be simpler and may avoid crossing of the signal lines. Moreover, the routing may occupy less valuable real estate on a semiconductor die. Furthermore, the measurement techniques may allow the number of temperature sensors to be flexibly adapted or changed. Consequently, the measurement techniques may reduce the cost and increase the yield of the integrated circuit, and may allow the integrated circuit to be used in a wide variety of systems and applications.

Figure 1:
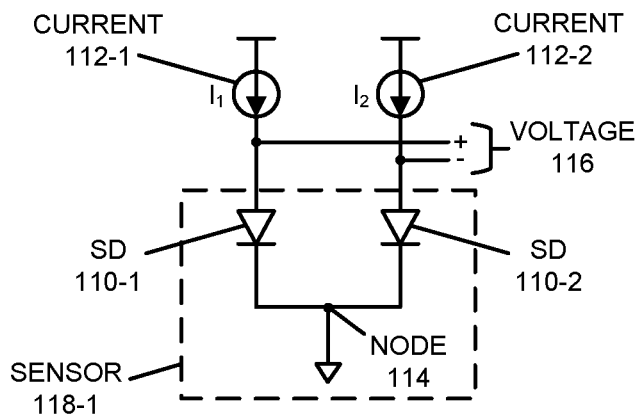
FIG. 1 is a drawing illustrating an existing implementation of a proportional-to-absolute-temperature (PTAT) technique.
Figure 2:
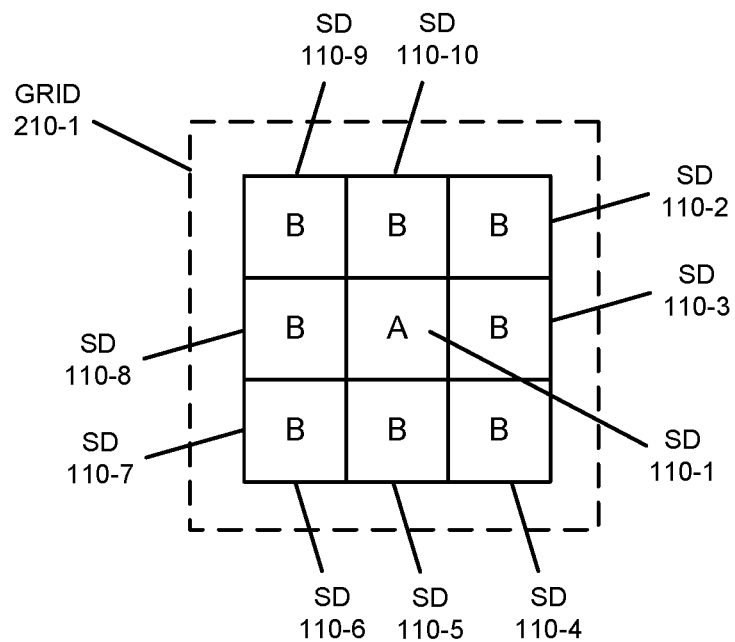
FIG. 2 is a drawing of an existing sense device.
Figure 3:
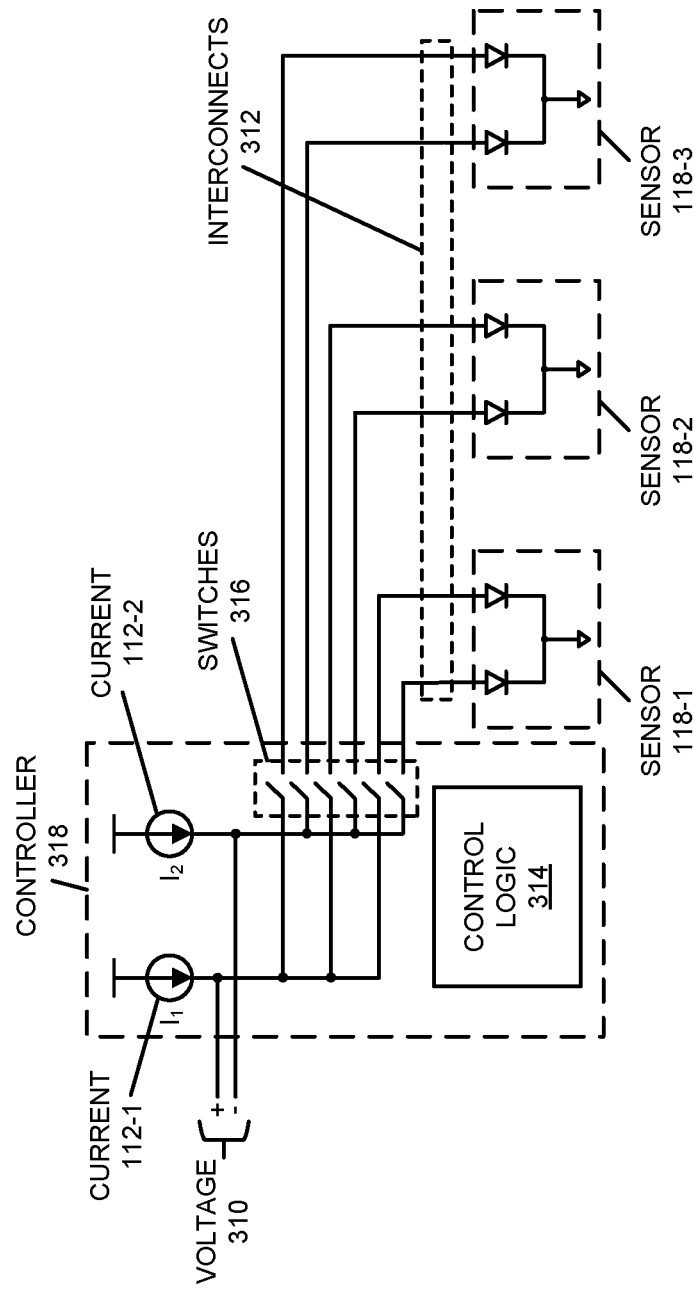
FIG. 3 is a drawing of an existing system.
Figure 4:
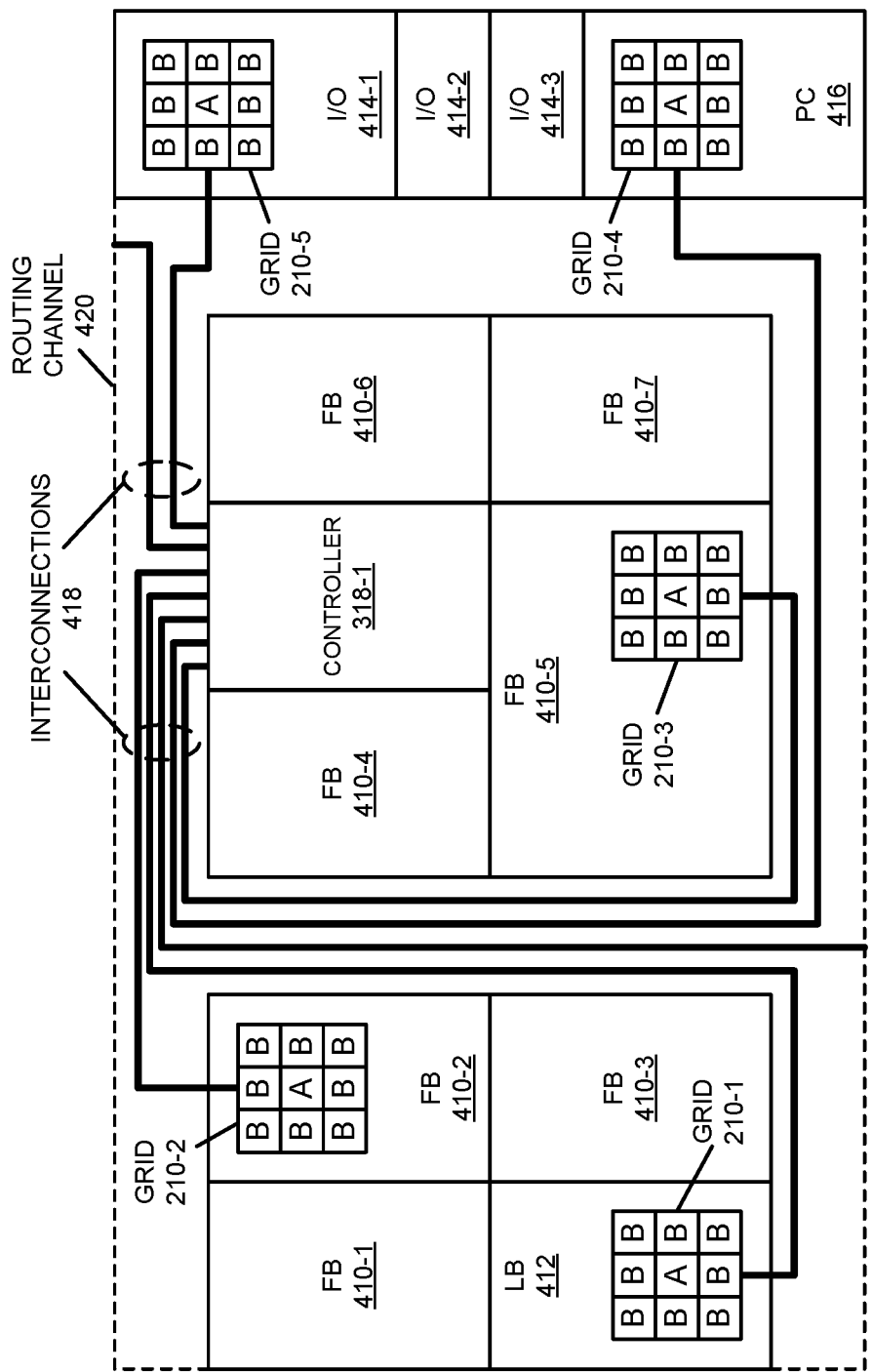
FIG. 4 is a drawing of an existing floorplan associated with a controller in the system of FIG. 3.
Figure 5:
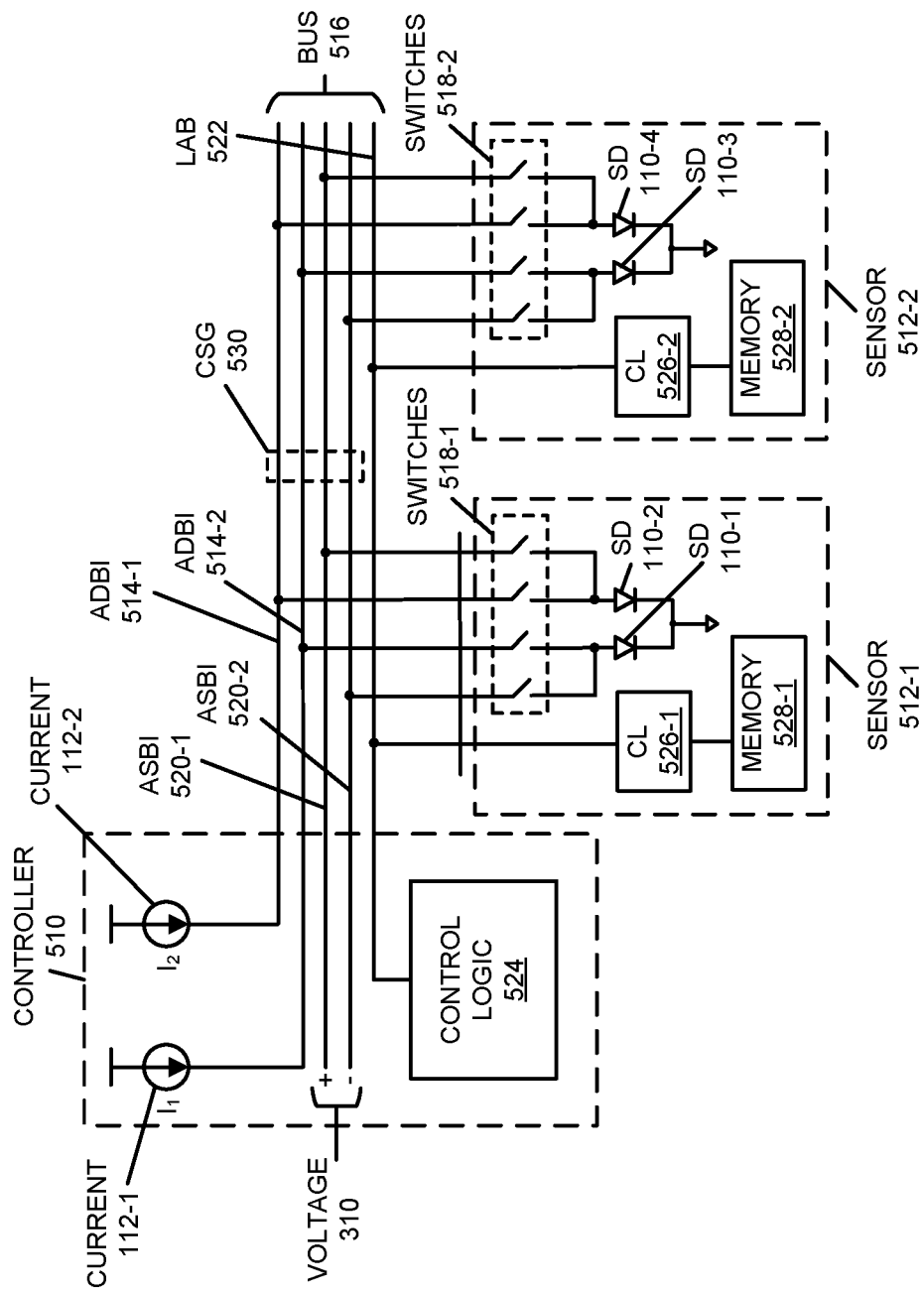
FIG. 5 is a block diagram illustrating an example of a temperature measurement system according to some embodiments of the present disclosure.

We now describe embodiments of the controller and the integrated circuit. FIG. 5 presents a block diagram illustrating an example of a temperature measurement system. This system includes a centralized controller 510 and multiple sensors 512. Controller 510 provides currents 112-1 and 112-2 to analog drive bus interconnects (ADBIs) 514, respectively, which sensors 512 have access to via bus 516. Each sensor has local switches 518 to selectively connect its sense devices 110 to the analog drive bus interconnects 514, respectively, when it is the active sensor. Additional analog sense bus interconnects (ASBIs) 520 are received by controller 510 to measure voltage 310. Moreover, sensors 512 are provided a logical address bus (LAB) 522, which control logic 524 in controller 510 may use to provide an address to indicate which of the sensors 512 should be active. Each of sensors 512 includes control logic (CL) 526 with an address decoder, which compares the address presented on logical address bus 522 to its configured address (which may be stored in memory 528, using pull-up resistors, or another type of nonvolatile indication of the configured address). When the address is determined to match the stored address, control logic 526 connects switches 518 to connect its devices 513 and 515 to the analog bus interconnects 514 and 520. Note that logical address bus 522 can be driven by the controller 510, or by other suitable logic.

A temperature measurement may begin by control logic 524 providing the address of a desired sensor (such as sensor 512-1) to logical address bus 522. The addressed sensor 512-1 may respond by detecting an address match and connecting its switches 518-1. The remaining sensors do not detect such a match and therefore do not connect their switches 518, so that the only sense devices 110 connected to analog bus interconnects 514 and 520 are the ones in the addressed sensor 512-1. Analog drive bus interconnects 514 and a first subset of switches 518 conduct the currents 112 from controller 510 into sense devices 110-1 and 110-2. The resulting voltage difference on sense devices 110-1 and 110-2 is propagated to the analog sense bus interconnects 520 by a second subset of switches 518. Moreover, controller 510 may receive this voltage and interprets it as measurement voltage 310. By using the second subset of switches 518 and analog sense bus interconnects 520 (i.e., Kelvin sensing), the effect of resistance in analog drive bus interconnects 514 and the first subset of switches 518 does not result in corruption of the measurement voltage 310 because of IR drop.

Figure 6:
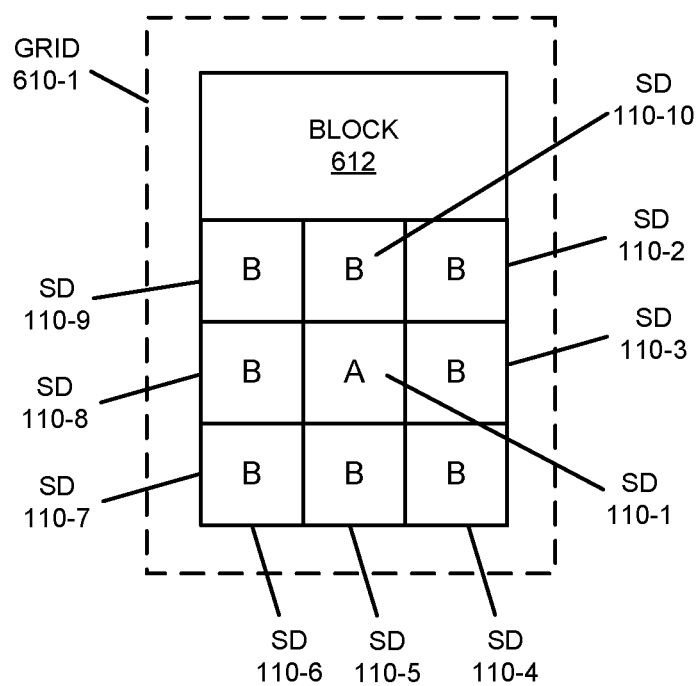
FIG. 6 is a drawing illustrating an example of a grid of sense devices arranged in a ratioed common-centroid tiling and a block with switches, control logic and memory according to some embodiments of the present disclosure.

The remote sensors 512 may be implemented using a common-centroid array of sensor devices 110 with an additional block containing switches 518 and control logic 526. This is shown in FIG. 6, which presents a drawing illustrating an example of a grid 610-1 of sense devices 110 arranged in a ratioed common-centroid tiling with a block 612 with switches 518-1, control logic 526-1 and memory 528-1. Note that the ratioed common-centroid tiling and block 612 may be provided to designers as prebuilt sub-components, so that the designer of a functional block requiring temperature sensing can simply include the prebuilt sub-component. In some embodiments, a library providing the prebuilt subcomponents may include a number of sub-components that each provide a different preassigned or preconfigured address. In other embodiments, the library may provide a subcomponent that does not yet have an assigned address, but provide a mechanism for the designer to assign the address at the time of inclusion (such as by adding additional metallization to program an address). Switches 518-1, control logic 526-1 and memory 528-1 may be optionally provided from the library as separate blocks to allow sense devices 110 to be placed closer to the location to be measured while allowing the designer to locate switches 518-1, control logic 526-1 and memory 528-1 in a less-crowded location inside a functional block.

Figure 7:
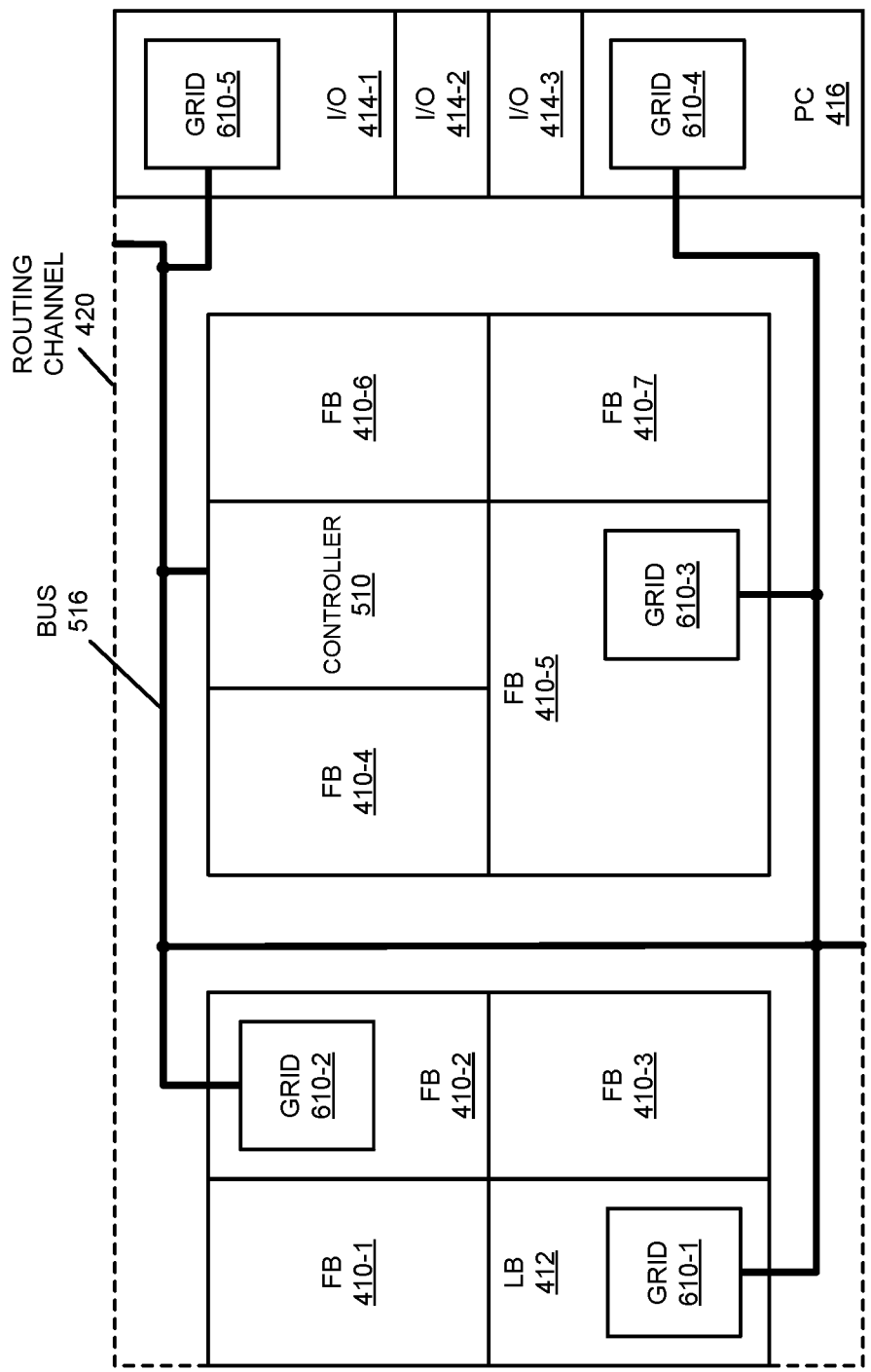
FIG. 7 is a block diagram illustrating an example of a floorplan in an integrated circuit according to some embodiments of the present disclosure.

Use of the measurement techniques may simplify the floorplan in an integrated circuit. This is shown in FIG. 7, which presents an example of a floorplan in an integrated circuit. Notably, routing between controller 510 and sensors 512 may accomplished by a global bus route 710. As shown in FIG. 5, the signal lines conveying analog signals in bus 516 may be routed together in a common shielded group (CSG) 530. Because there may only be one such shielded group, congestion associated with multiple such routes may be eliminated. Furthermore, with only one common shielded route, there may not be a concern that two such routes will need to cross, thereby eliminating this cause of congestion. In some embodiments, common shielded route 530 may be provided in one of a number of routing channels as a preplanned bus route. Note that the logical address signals do not need to be shielded, so they can either be routed with the analog bus group, or they may be routed independently, as determined using automated tools for other logic signals.

The measurement techniques may also provide design flexibility which may allow changes to the number of sensors (or functional blocks containing sensors) with minimal design effort. Thus, as sensors are added and removed from an integrated circuit, controller 510 and bus 516 may have minimal or no change. Moreover, adding temperature measurements to a location with access to an existing bus route in bus 516 may only require adding another instance of sensors 512, assigning an address, and connecting it to bus 516. Alternatively, removing an instance of sensors 512 only requires that it be removed. In contrast with a system having dedicated routes and multiplexing inside a controller, controller 510 may be designed to accommodate an arbitrary number of sensors. For example, if the logical address is provided as an 8-bit binary number, there may be as many as 256 sensors without running out of addresses. In general, routing overhead associated with N sensors may be a number of logic routes as low as log 2(N) rounded to the nearest integer, as opposed to N-shielded analog routes in existing approaches.

In some embodiments, a given one of sensors 512 may have a smaller number of block address bits and one or more block select signals. For example, the given sensor may have a 4-bit block address and one block select signal. Moreover, for each block select signal, up to 16 sensors may be assigned. In such a system, the block address (or suitably buffered versions) may be routed to all components, while the block select signals may be assigned so that sensors in similar areas of the integrated circuit may use the same block select. Because the address signals are logic signals, the custom routing may be implemented using automated tools and, therefore, the complexity of the physical implementation may be less of a concern. Furthermore, controller 510 that provides the addresses may be implemented using a hardware-description-language (HDL), so that changes in the addressing technique and address mapping may be implemented using synthesized logic.

Figure 8:
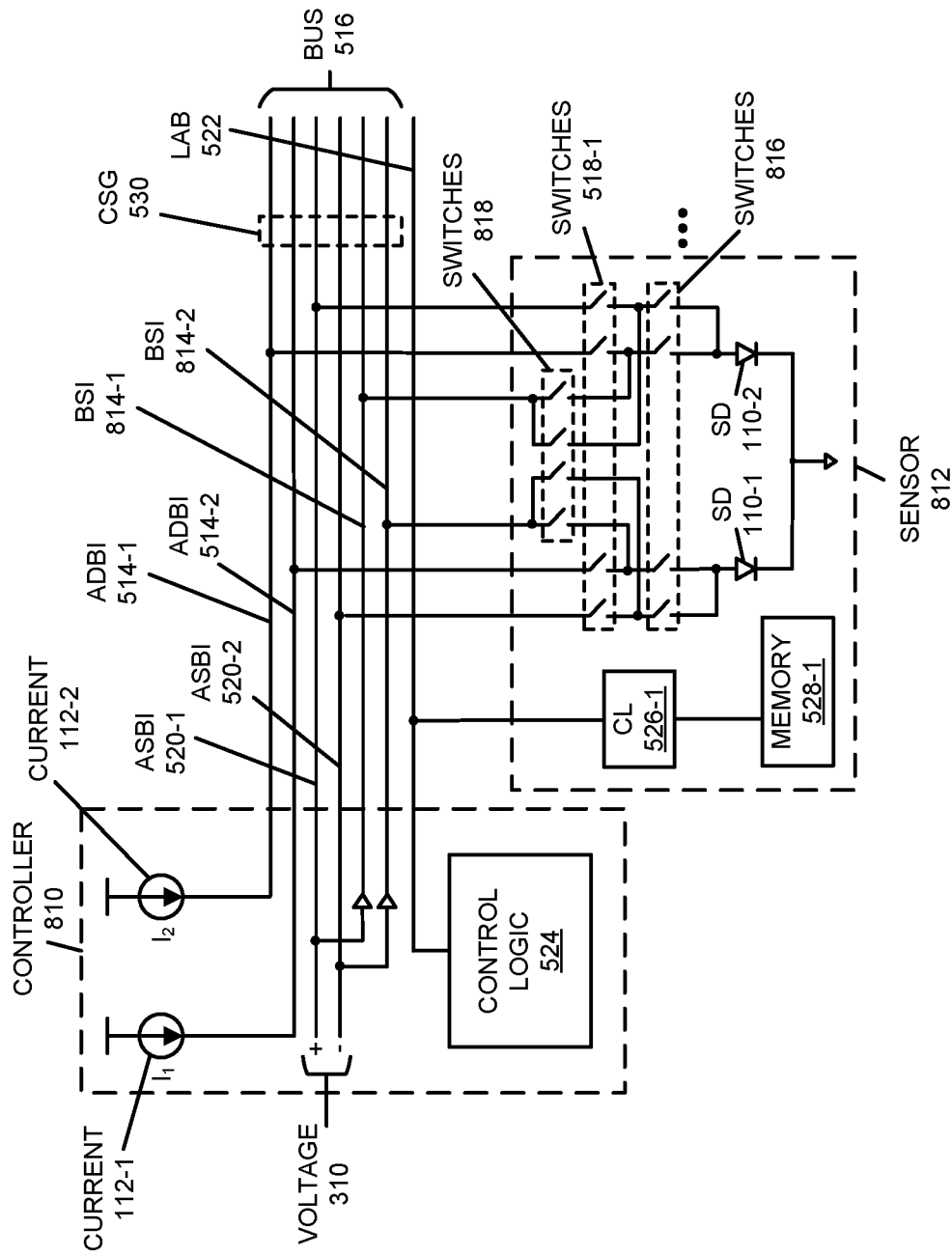
FIG. 8 is a block diagram illustrating an example of a temperature measurement system according to some embodiments of the present disclosure.

In some embodiments, the measurement techniques may be used to reduce switch leakage associated with disabled sensor, and thus potential corruption of measurements of an enabled sensor. For example, the switch leakage may be caused by a sub-threshold current through a nominally disabled switch. In some embodiments, this leakage current may be mitigated by providing buffered low-leakage switches. This is shown in FIG. 8, which presents a block diagram illustrating an example of a temperature measurement system, including controller 810 and multiple sensors (such as sensor 812). Notably, controller 810 may provide additional buffered versions of signals on analog sense bus interconnects 520 back into the bus route as buffered sense signals on buffered sense interconnects (BSIs) 814. Moreover, switches 518 may be augmented with series switches 816. At the series connection points of these series switches, switches 818 with opposite logical control (e.g., switches 818 may be closed when switches 518 and 816 are open) may selectively connect these connection points to the appropriate buffered sense signals on buffered sense interconnects 814. In this way, each disabled sensor presents a logically open switch to the analog drive bus interconnects 514 and the analog sense bus interconnects, where each of switches 518 has the same voltage on both terminals. Because there is no voltage across switches 518, the leakage current associated with switch leakage may be removed or eliminated.

Figure 9:
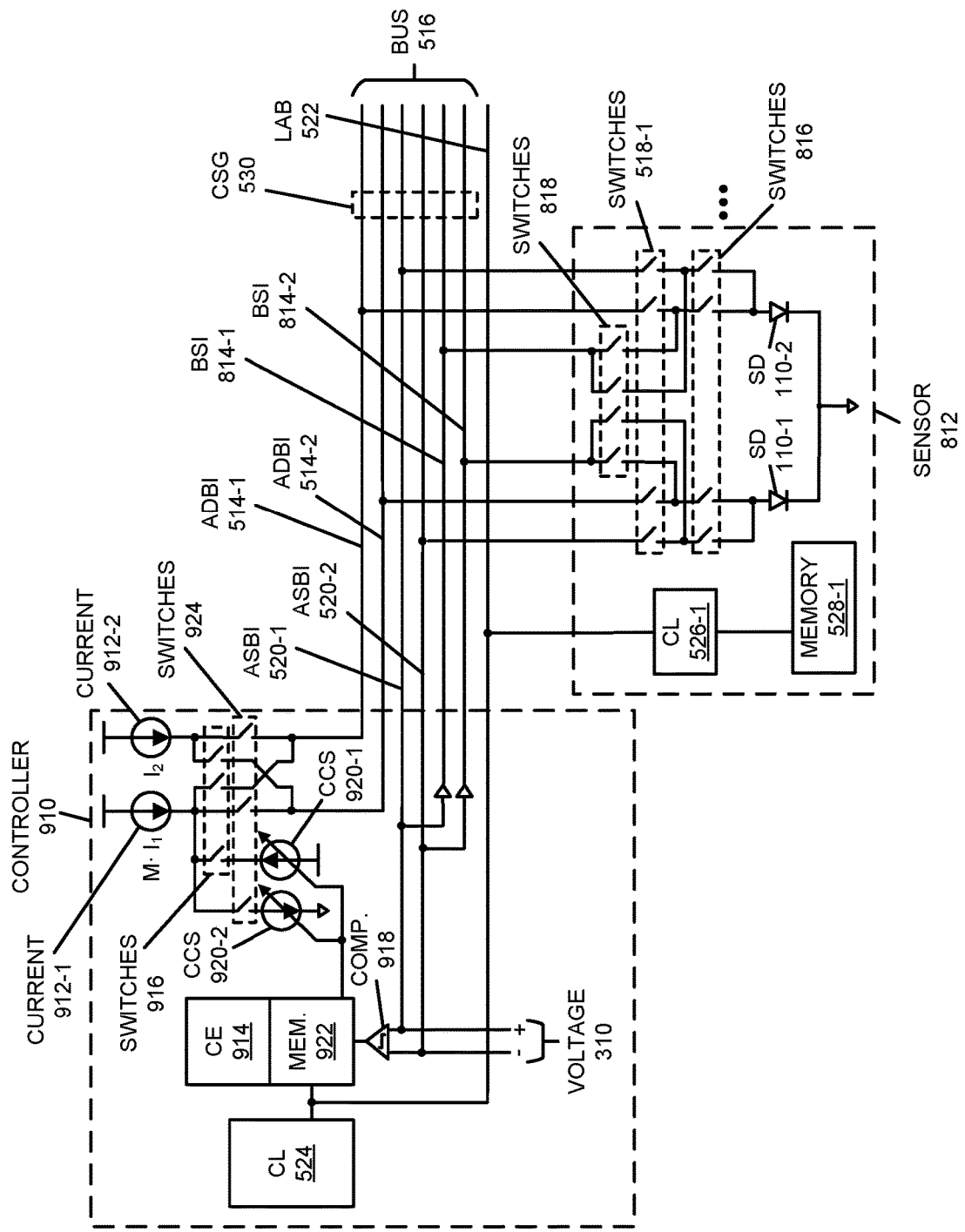
FIG. 9 is a block diagram illustrating an example of a temperature measurement system according to some embodiments of the present disclosure.

Moreover, in some embodiments the measurement techniques may be used to address mismatch between sense devices 110, so that the ratio between sense devices 110 remains as intended. Note that mismatch may occur because of a variety of causes, such as manufacturing variation, random variation across the semiconductor die, aging, etc. FIG. 9 presents a block diagram illustrating an example of a temperature measurement system, which may reduce the effect of mismatches among sense devices 110. In FIG. 9, temperature sensor controller 910 may connected to multiple sensors (such as sensor 812). Moreover, a given sensor may have an inaccuracy in the ratio of its sense devices 110, such that the intended ratio is a number M, but the actual ratio may be a slightly different number (M+ΔM), and ΔM may potentially be different for different sensors.

In order to address this problem, before the temperature measurement is performed, a calibration measurement may be performed. Notably, controller 910 may include current sources 912, which may be configured to provide currents in a ratio M that is the same as the nominal sensor-device ratio M. During the calibration measurement, calibration engine (CE) 914 inside controller 910 may provide one or more control signals to close switches 916, which may cause current 912-1 to be routed to analog drive bus interconnect 514-1 and current 912-2 to be routed to analog drive bus interconnect 514-2. Moreover, control logic 524 may provide addressing signals on logical address bus 522 to the sensor to be calibrated (such as sensor 812) that match the assigned logical address of this sensor. The address match may be detected by control logic 526-1 (such by using an address comparator). In response, control logic 526-1 may provide one or more control signals that close switches in switches 518 and 816 to analog drive bus interconnects 514, and that open switches 818. This may route current 912-1 to sense device 110-2 and current 912-2 to sense device 110-1.

Moreover, control logic 526-1 may provide one or more control signals that close switches in switches 518 and 816 to analog sense bus interconnects 520. Consequently, the voltage difference between sense devices 110 may be routed through analog sense bus interconnects 520, which controller 910 may receive as a voltage difference 310. Comparator 918 may indicate to calibration engine 914 whether differential voltage 310 is positive or negative. Alternatively, voltage difference 310 may be digitized into a multibit logic signal, such as by providing an ADC output to calibration engine 914 instead of the output of comparator 918.

When sense devices 110 have no mismatch (e.g., ΔM equals 0), then differential voltage 310 is zero, because currents 912 are in the same ratio M as the sense devices 110 that receive these currents. Alternatively, when sense devices 110 have a mismatched ratio of (M+ΔM), there may be a non-zero differential voltage 310.

Then, calibration engine 914 may provide one or more control signals to close one of switches 916 to connect a controllable current source (CCS) 920-1, so that a current from the controllable current source 920-1 is also routed to analog drive bus interconnect 514-1, via another one of switches 916. This controllable current source may be a DAC current source or another suitable controllable current. Calibration engine 914 may adjust the current from controllable current source 920-1 in order to minimize differential voltage 310, such as by performing a binary search based at least in part on the output of comparator 918. After the calibration adjustment, the ratio of the currents driven on analog drive bus interconnects 514 may also be (M+ΔM). Moreover, calibration engine 914 may store the control value for controllable current source 920-1 in memory 922 for later use.

In order to perform a temperature measurement, calibration engine 914 may provide one or more control signal to close switches 924 and to open switches 916. This may cause currents 912-1 and 912-2 to be routed to analog drive bus interconnect 514-2 and analog drive bus interconnect 514-1, respectively. A current from controllable current source 920-2 may also be routed to analog drive bus interconnect 514-2 through one of switches 924. Controllable current source 920-2 may provide the same magnitude current as controllable current source 920-1 for a given current control signal or value from calibration engine 914, but may have the opposite sign. In some embodiments, calibration engine 914 may access, from memory 922, the stored control value (such as by indexing the control value with a sensor logical address) and may provide this control signal or value to controllable current source 920-2.

Moreover, control logic 524 may provide sensor 812 with a matching logical address, resulting in switches 518 and 816 to analog drive bus interconnects 514 being closed, switches 818 being opened, and switches 518 and 816 to analog sense bus interconnects 520 being closed. In this way, current 912-1 and a current from controllable current source 920-2 may be routed to sense device 110-1, and current 912-2 may be routed to sense device 110-2. This may result in currents with a ratio (M−ΔM):1 to be applied to sense devices 110 with a ratio 1:(M+ΔM). In turn, this may result in a differential voltage of $$\frac{\ln(M^2 - \Delta M^2) \cdot n \cdot k \cdot T}{q}.$$

If ΔM is sufficiently small, this is effectively the same as $$\frac{\ln(M^2) \cdot n \cdot k \cdot T}{q}.$$

Note that this voltage may be provided to analog sense bus interconnects 520 by switches in switches 518 and 816, which results in voltage difference 530 in controller 910. This voltage difference may be used for temperature indication, such as by digitizing using an ADC, comparing it against a threshold, or other uses.

The disclosed controller, the integrated circuit and the measurement techniques can be (or can be included in) any electronic device. For example, the electronic device may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, a vehicle, a ship, an airplane, a car, a truck, a bus, a motorcycle, manufacturing equipment, farm equipment, construction equipment, or another type of electronic device.

Although specific components are used to describe the embodiments of the controller and the integrated circuit, in alternative embodiments, different components and/or subsystems may be present in the controller and/or the integrated circuit. Thus, the embodiments of the controller and/or the integrated circuit may include fewer components, additional components, different components, two or more components may be combined into a single component, a single component may be separated into two or more components, and/or one or more positions of one or more components may be changed.

Moreover, the circuits and components in the embodiments of the controller and/or the integrated circuit may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that electrical coupling or connections in the preceding embodiments may be direct or indirect. In the preceding embodiments, a single line corresponding to a route may indicate one or more single lines or routes.

An integrated circuit may implement some or all of the functionality of the measurement techniques. This integrated circuit may include hardware and/or software mechanisms that are used for implementing functionality associated with the measurement techniques.

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the measurement techniques may be implemented using program instructions that are executed by a processor or in firmware in an integrated circuit.

Moreover, while examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
memory;
a controller coupled to the memory;
temperature sensors distributed at measurement locations in a semiconductor die, wherein a given temperature sensor comprises instances of building blocks that are included in all the temperature sensors; and
routing between the controller and the instances of the building blocks over an addressable bus, wherein signal lines for analog signals in the addressable bus are reused when communicating between the controller and different temperature sensors, wherein a number of the temperature sensors in the integrated circuit is limited by a number of bits used for addressing the temperature sensors.

2. The integrated circuit of claim 1, wherein the instances of the building blocks in the given temperature sensor comprise a common-centroid array of sensor devices and another building block that comprises switches and control logic for the switches; and
wherein the control logic is configured to control the switches based at least in part on addressing signals and a given address of the given temperature sensor.

3. The integrated circuit of claim 2, wherein, when inactive or unused, the given temperature sensor comprises another switch configured to provide a replica voltage to a terminal of one of the switches in order to maintain approximately zero volts across the one of the switches.

4. The integrated circuit of claim 2, wherein the integrated circuit comprises addressing control logic associated with the controller; and
wherein the switches and the addressing control logic are located at different physical locations on the semiconductor die.

5. The integrated circuit of claim 4, wherein the addressing control logic is configured to control changes to a number of the temperature sensors in the integrated circuit.

6. The integrated circuit of claim 4, wherein the controller is configured to use the memory and the addressing control logic to calibrate the temperature sensors.

7. The integrated circuit of claim 1, wherein the signal lines for the analog signals in the addressable bus use Kelvin sensing.

8. The integrated circuit of claim 1, wherein the signal lines for the analog signals to the given temperature sensor are configured to convey: a current to at least a sensor device in the given temperature sensor; and a voltage from at least the sensor device to the controller.

9. The integrated circuit of claim 1, wherein the addressable bus comprises bus routes.

10. The integrated circuit of claim 9, wherein the signal lines for the analog signals in the bus routes are routed together in one or more common shielded groups.

11. The integrated circuit of claim 10, wherein signal lines for logical address signals are routed with the signal lines for the analog signals, but are not be included in the one or more common shielded groups.

12. The integrated circuit of claim 1, wherein, when there are N temperature sensors, the addressable bus comprises a number of logic routes equal to log 2(N) rounded to the nearest integer.

13. The integrated circuit of claim 1, wherein the addressable bus comprises another signal line, from the temperature sensors to the controller; and
wherein the controller is configured to use a signal received on the other signal line to generate feedback to the routing to reduce a leakage current.

14. The integrated circuit of claim 1, wherein the integrated circuit is configured to perform sensor calibration; wherein the sensor calibration comprises:
a calibration mode in which a first sensor device in the given temperature sensor is provided a first fixed current and a first controlled current, and a second sensor device in the given temperature sensor is provided a second fixed current; and
a measurement mode in which the first sensor device is provided a third fixed current and the second sensor device is provided a fourth fixed current and a second controlled current; and
wherein the integrated circuit comprises a calibration controller configured to: adjust the first controlled current based at least in part on a voltage observed between the first sensor device and the second sensor device; and calculate a value of the second controlled current based at least in part on a value of the first controlled current.

15. The integrated circuit of claim 14, wherein the first fixed current equals the fourth fixed current, and the second fixed current equals the third fixed current.

16. The integrated circuit of claim 14, wherein the calculation of the second controlled current comprises reversing the sign of the first controlled current.

17. The integrated circuit of claim 14, wherein the integrated circuit comprises:
switches configured to generate the first fixed current and the fourth fixed currents using a circuit component; and
second switches configured to generate the first controlled current and the second controlled current from a current digital-to-analog converter (DAC).

18. An electronic device, comprising an integrated circuit, wherein the integrated circuit comprises:
memory;
a controller coupled to the memory;
temperature sensors distributed at measurement locations in a semiconductor die, wherein a given temperature sensor comprises instances of the building blocks that are included in all of the temperature sensors; and
routing between the controller and the instances of the building blocks over an addressable bus, wherein signal lines for analog signals in the addressable bus are reused when communicating between the controller and different temperature sensors, wherein a number of the temperature sensors in the electronic device is limited by a number of bits used for addressing the temperature sensors.

19. The electronic device of claim 18, wherein the instances of the building blocks in the given temperature sensor comprise a common-centroid array of sensor devices and another building block that comprises switches and control logic for the switches; and
wherein the control logic is configured to control the switches based at least in part on addressing signals and a given address of the given temperature sensor.

20. A method for controlling temperature sensors, comprising:
by a controller in an integrated circuit:
routing a current to a sensor device in given temperature sensor in temperature sensors distributed at measurement locations in a semiconductor die, wherein the given temperature sensor comprises instances of the building blocks that are included in all of the temperature sensors, wherein the routing between the controller and the temperature sensors is over an addressable bus, and wherein signal lines for analog signals in the addressable bus are reused when communicating between the controller and different temperature sensors; and
conveying a voltage from the sensor device to the controller via the addressable bus, wherein a number of the temperature sensors in the integrated circuit is limited by a number of bits used for addressing the temperature sensors.

* * * * *